US012367559B2

(12) United States Patent
Mevenkamp et al.

(10) Patent No.: US 12,367,559 B2
(45) Date of Patent: Jul. 22, 2025

(54) METHOD AND APPARATUS FOR THE CONTACTLESS MEASUREMENT OF OBJECTS

(71) Applicant: Carl Zeiss Industrielle Messtechnik GmbH, Oberkochen (DE)

(72) Inventors: Niklas Mevenkamp, Jena (DE); Aksel Göhnermeier, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 18/743,041

(22) Filed: Jun. 13, 2024

(65) Prior Publication Data

US 2024/0420292 A1    Dec. 19, 2024

(30) Foreign Application Priority Data

Jun. 13, 2023  (EP) ..................................... 23179016

(51) Int. Cl.
*G06T 5/73*    (2024.01)
*G01B 11/24*   (2006.01)

(52) U.S. Cl.
CPC ............... *G06T 5/73* (2024.01); *G01B 11/24* (2013.01)

(58) Field of Classification Search
CPC .................................. G06T 5/73; G01B 11/24
See application file for complete search history.

(56) References Cited

U.S. PATENT DOCUMENTS

| 9,479,754 | B2 | 10/2016 | Tang et al. |
| 10,120,163 | B2 | 11/2018 | Seitz et al. |
| 2006/0279639 | A1 | 12/2006 | Silverstein et al. |
| 2007/0009169 | A1 | 1/2007 | Bhattacharjya |
| 2009/0169080 | A1 | 7/2009 | Noordhoek |

(Continued)

FOREIGN PATENT DOCUMENTS

| DE | 102012106584 A1 | 1/2014 |
| DE | 102015010214 A1 | 5/2016 |

(Continued)

OTHER PUBLICATIONS

Search Report issued in European Patent Application No. EP 23 17 9016.3, dated Nov. 17, 2023 (from which this application claims priority) and English language translation thereof.

*Primary Examiner* — Mohamed A. Wasel
(74) *Attorney, Agent, or Firm* — Ewers IP Law PLLC; Falk Ewers

(57) ABSTRACT

A method and apparatus are provided to perform contactless measurement of an object with a measuring camera. The method includes producing an uninterrupted relative motion between the measuring camera and a surface of the object. A plurality of images of the surface of the object are recorded during the relative motion, each image showing a different segment of the surface. A blur of the images that is produced by the relative motion is computationally extracted by applying a deconvolution algorithm, use being made of different convolution kernels that differ from one another in at least one zero. In this case, e.g., exactly one image of each segment of the surface can be recorded. During the recording of the exactly one image at least one recording parameter is changed such that the convolution kernel during the recording changes in at least one zero.

12 Claims, 3 Drawing Sheets

(56) References Cited

U.S. PATENT DOCUMENTS

| | | | | |
|---|---|---|---|---|
| 2013/0293722 | A1* | 11/2013 | Chen | .................. H04N 23/11 |
| | | | | 362/555 |
| 2015/0181131 | A1 | 6/2015 | Kerwien et al. | |
| 2018/0295410 | A1* | 10/2018 | Shinozaki | .............. H04N 23/60 |
| 2021/0004947 | A1* | 1/2021 | Nakano | .................. G06T 7/90 |

FOREIGN PATENT DOCUMENTS

| | | |
|---|---|---|
| DE | 102016202928 A1 | 8/2017 |
| GB | 2280812 A | 2/1995 |

\* cited by examiner

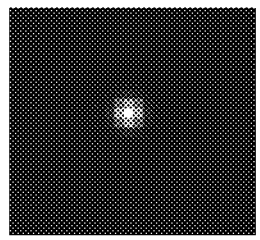
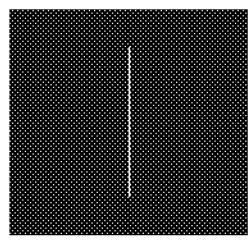
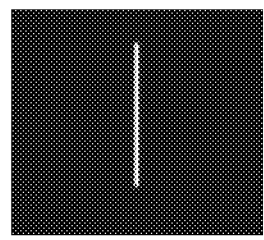
FIG. 1A
Prior Art
FIG. 1B
Prior Art
FIG. 1C
Prior Art
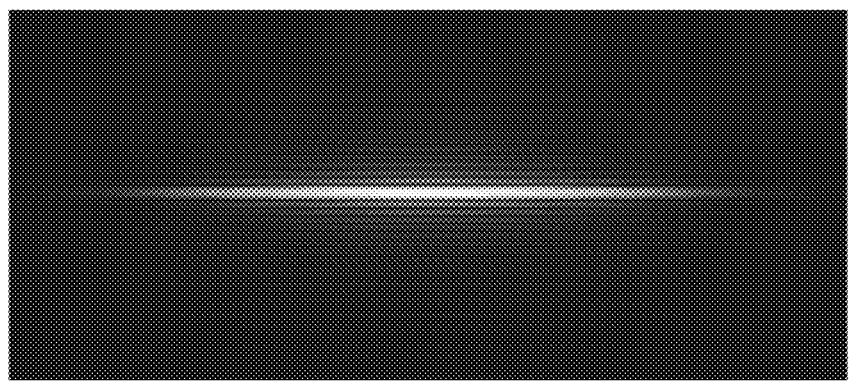
FIG. 2
Prior Art
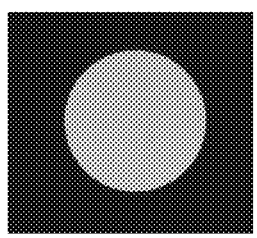
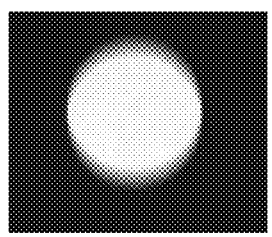
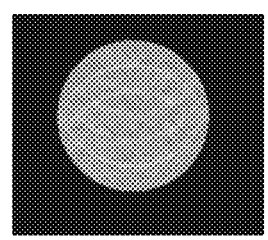
FIG. 3A
Prior Art
FIG. 3B
Prior Art
FIG. 3C
Prior Art

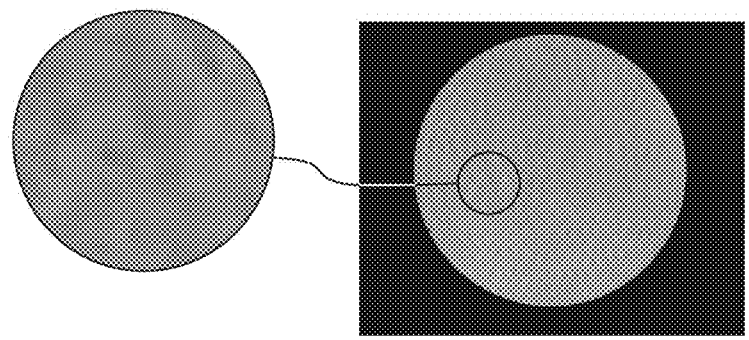
FIG. 4
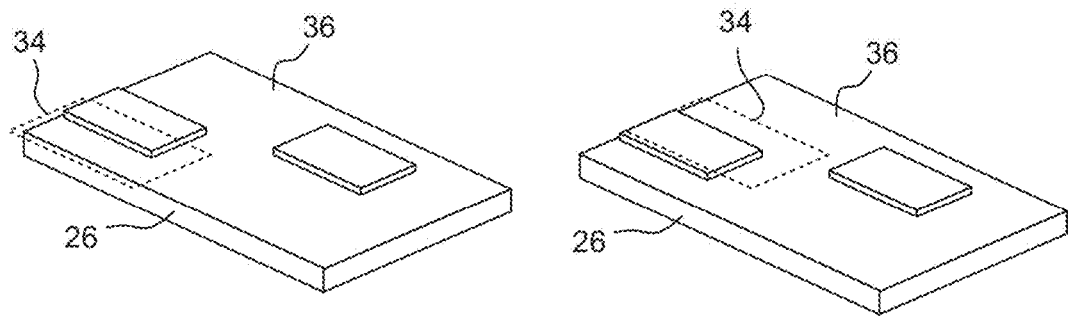
FIG. 6A  FIG. 6B
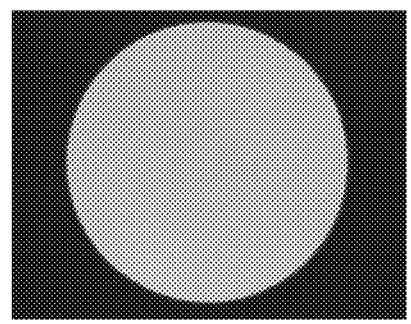
FIG. 7

METHOD AND APPARATUS FOR THE CONTACTLESS MEASUREMENT OF OBJECTS

CROSS REFERENCE TO RELATED APPLICATIONS

This application claims priority to European patent application EP 23179016.3, filed Jun. 13, 2023, the entire content of which is incorporated herein by reference.

TECHNICAL FIELD

For measuring shapes and surfaces of workpieces and other objects, tactile or optical sensors are used. Such measurements take place, for example, as part of the quality assurance or as part of reverse engineering.

BACKGROUND

The sensors in most cases have only a small measurement region, which is not sufficient for measuring larger workpieces. Coordinate measuring machines therefore contain a displacement device, with which the pose (i.e., the position and orientation) of the sensor relative to the workpiece to be measured can be changed. Especially in the case of smaller coordinate measuring machines, the workpiece is frequently located on an X-Y table, which can be displaced along two horizontal coordinate axes x, y with great accuracy. The sensor is attached to a quill, which can be displaced vertically (i.e., in the z-direction) with a similarly high level of accuracy. If larger or particularly heavy workpieces are intended to be measured, coordinate measuring machines having a gantry configuration are used, in which the workpiece is stationary and merely the sensor is displaced.

With regard to the sensors, a distinction is made between optical and tactile sensors. Whereas the information relating to the position of a measurement point is generated by making contact with the measurement point using a probing element in the case of tactile sensors, the information relating to the position of the measurement point is captured by light in the case of optical sensors.

In the case of the optical sensors, a distinction is in turn made between pointwise and areally measuring sensors. Areally measuring sensors are generally configured as a measuring camera that records two-dimensional images of the surface of the object to be measured. One of the main advantages of such a measuring camera is the high measuring speed, since—unlike tactile and other pointwise measuring sensors—it simultaneously captures the coordinates at a plurality of measurement points. Coordinate measuring machines having optical sensors are sold by the applicant, for example under the brand name ZEISS O-INSPECT, and are described in DE 10 2016 202 928 A1 (corresponds to US 2017/0248768 A).

In order to measure surfaces which are larger than the image segment, hitherto images whose image segments slightly overlap have been recorded at different relative positions between measuring camera and object. The individual images are subsequently joined together by so-called "stitching" in order in this way to obtain measurement points at all desired measurement positions on the surface of the object.

Although the measuring cameras enable a high measuring speed, a measurement of a surface that is carried out in this way requires a significant amount of time. The reason for this is that the measuring camera needs to have come completely to rest in order that the recorded image is not blurred. Consequently, between the successive recordings of two images there elapses a displacement time for the actual displacement movement, and also a decay time, which necessitates waiting until possible vibrations have completely decayed. Although faster displacement movements lead to a shorter displacement time, they generally lengthen the decay time owing to the higher accelerations.

Algorithms for subsequently deblurring images on the basis of mathematical deconvolution are known per se in the prior art. In this regard, GB 9316307 A describes subdividing a recorded image into different regions that are assigned different motion vectors. The deconvolution is then carried out separately for each region, certain regions being excluded from the deconvolution in order to avoid artefacts.

US 2006/0279639 A1 describes how the motion of a digital camera is captured by a camera-internal sensor. The convolution kernel derived therefrom is subsequently used for deconvolution.

US 2007/0009169 A1 is concerned with determining the convolution kernel by analyzing the recorded blurred image.

US 2009/0169080 A1 discloses recording a plurality of images of the object in order to be able to draw conclusions therefrom about the relative motion and thus the motion vector, which is required for the deconvolution.

What the known methods have in common, however, is that the images deblurred by deconvolution have artefacts that lead to measurement inaccuracies.

DE 10 2012 106 584 B4 describes recording two individual images of the same object with different but known parameters of the optical system. The parameters may be, for example, different pupil aberrations that are introduced by rapidly switchable pupil filters. Alternatively, the individual images can be recorded with differing defocus. In this case, the two images are recorded one after the other so rapidly that the position of the object relative to the camera can be assumed to be constant. With the two individual images it is possible to bring about a shift of spatial frequencies of the object relative to zeros of the modulation transfer function (MTF) of the optical system. For example, if the first individual image is recorded without defocus and the second individual image is recorded with defocus, from the second individual image it is possible to obtain information which was not derivable from the first individual image because the modulation transfer function had zeros at the corresponding spatial frequencies.

SUMMARY

A problem addressed by the disclosure is that of providing a method and an apparatus for the contactless measurement of objects with the aid of a measuring camera which enable shorter measurement times with consistently high measurement accuracy.

With regard to the method, the problem is solved by a method for the contactless measurement of an object with a measuring camera, the method including the following steps:

a) an uninterrupted relative motion between the measuring camera and a surface of the object is produced;

b) a plurality of images of the surface of the object are recorded during the relative motion, each image showing a different segment of the surface; and c) a blur of the images that is produced by the relative motion is computationally extracted by way of applying a deconvolution algorithm, use being made of different convolution kernels that differ from one another in at least one zero.

The inventors have recognized that the measurement time can be considerably shortened if the images are recorded during the relative motion. It is true that the images are then blurred (in photography this would be referred to as "blurry") owing to the relative motion. However, blur of the images can be computationally extracted by a deconvolution.

The inventors have additionally recognized that the artefacts that occur in the known deconvolution methods can be avoided if different convolution kernels that differ from one another in at least one zero are used in the deconvolution.

In a first variant, at least two images of each segment of the surface are recorded. Between the recordings of the at least two images at least one recording parameter is changed such that the convolution kernels in the case of the at least two recordings differ from one another in at least one zero and the point spread function changes non-linearly. This substantially corresponds to the procedure proposed in DE 10 2012 106 584 B4 mentioned above.

In a second variant, exactly one image of each segment of the surface is recorded. During the recording of the exactly one image at least one recording parameter is changed such that the convolution kernel during the recording changes in at least one zero and the point spread function changes non-linearly. This variant has the advantage that the measuring camera need not have devices which enable a recording parameter to be changed very rapidly, e.g., rapidly switchable pupil filters or mechanically displaceable image sensors.

The at least one recording parameter can be, e.g., a speed of the relative motion, a direction of the relative motion, an exposure time, or an intensity of the illumination.

If the recording parameter is the speed or direction of the motion, linear motions with directions and/or speeds that are different, but constant during the recording, are sufficient. However, a non-linear motion makes available an additional degree of freedom that can be used in the optimization of the zero sets.

In both variants, the at least one recording parameter is changed such that the point spread function changes non-linearly. If in the first variant, for example, two images were recorded with different exposure intensities, the latter being constant over time during the respective recording, however, then the resulting zero sets of the point spread function spectra would differ from one another merely by a scalar factor. Therefore, additional information enabling artefacts to be prevented cannot be obtained. If in the second variant, e.g., the illumination intensity is changed during the recording of the image, this automatically has a non-linear influence on the point spread function.

In order to stipulate which recording parameter is changed and how, a merit function can be defined, the value of which is optimized with the aid of an optimization algorithm. In this case, the merit function is typically proportional to a sum of normalized Fourier spectra of the point spread function, which is dependent on a plurality of recording parameters.

The disclosure furthermore relates to an apparatus for the contactless measurement of an object, comprising a displacement device, a measuring camera and a control device configured to control the displacement device such that the measuring camera is moved in an uninterrupted relative motion relative to a surface of the object, the measuring camera recording a plurality of images of the surface of the object during the relative motion, each of said images showing a different segment of the surface. The apparatus additionally includes an evaluation device configured to computationally extract a blur of the images that is produced by the relative motion by way of applying a deconvolution algorithm, use being made of different convolution kernels that differ from one another in at least one zero.

In a first variant, the control device is configured to record at least two images of each segment of the surface, between the recordings of the at least two images at least one recording parameter being changed such that the convolution kernels in the case of the at least two recordings differ from one another in at least one zero.

In a second variant, the control device is configured to record exactly one image of each segment of the surface, during the recording of the exactly one image at least one recording parameter being changed such that the convolution kernel during the recording changes in at least one zero.

BRIEF DESCRIPTION OF THE DRAWINGS

The disclosure will now be described with reference to the drawings wherein:

FIG. 1A shows one example of a point spread function $p_s$ of a camera system;

FIG. 1B shows one example of a point spread function pm of a vertical linear camera motion;

FIG. 1C shows one example of the convolution kernel p resulting from the convolution in FIGS. 1A and 1B, FIG. 2 shows the logarithmic spectrum of the point spread function p from FIG. 1C;

FIG. 3A shows an exemplary object;

FIG. 3B shows the image of the object shown in FIG. 3A with motion blur;

FIG. 3C shows the image—obtained by a direct deconvolution—of the object shown in FIG. 3A according to the prior art;

FIG. 4 shows the image—obtained by additional regularization—of the object shown in FIG. 3A according to the prior art;

FIGS. 6A and 6B show perspective views of a workpiece to be measured at different times in a measuring process; and FIG. 7 shows a substantially artefact-free image obtained by the deconvolution according to the disclosure.

DESCRIPTION OF EXEMPLARY EMBODIMENTS

Figure 5:
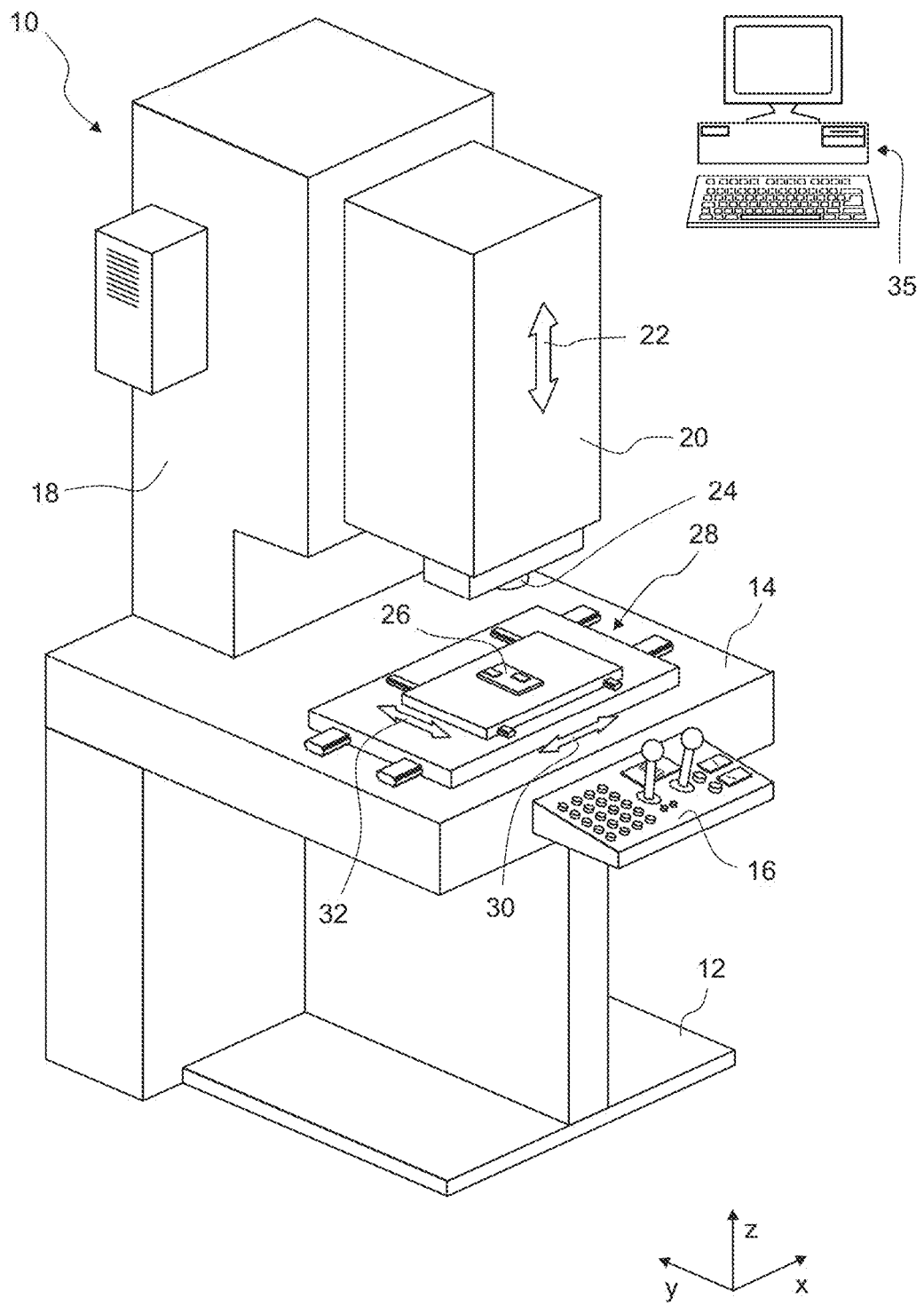
FIG. 5 shows a coordinate measuring machine of X-Y table design with a measuring camera according to the disclosure.

1. Introduction and Technical Background a) Image Formation

We first consider how images are formed in a camera. A perfect image will be produced on the image sensor of a camera if two requirements are fulfilled. The first requirement is that all light emitted from a point on the object and entering the camera is concentrated exactly on one point on the image sensor. This results in a perfectly sharp image. If light emitted from a point on the object does not impinge on the corresponding point on the image sensor, but somewhere in its neighborhood, this contributes to blurring.

The second requirement is that these points on the image sensor perfectly correspond to the points on the object. For example, if we consider a couple of points on the object that are situated at the corners of a regular grid, this grid should be reproduced on the image sensor. If this is not the case, the image recorded by the camera will be distorted. In distorted images, parallel lines on the object are not parallel on the image sensors, or a circle becomes an ellipse, for example. It should be noted that blurring and distortion are independent effects. This implies that an image may be sharp, but distorted. Similarly, an image may be blurred, but undistorted.

In the following, we focus on the first requirement and disregard the second requirement relating to distortion.

FIG. 3A shows a simple object which has the shape of a circular disk with a perfectly smooth surface. We now assume that a measuring camera takes an image of this object while the camera is moving along a vertical direction with respect to the resting image. Alternatively, we could assume that the camera rests and the object is moving. This does not make any difference-what matters is only the relative motion between the object and the camera.

As any photographer knows, taking a photo in such a situation tends to produce a blurred image, as this is shown in FIG. 3B. One can see that the blurring effect mainly occurs in the direction of movement. However, there is also a little blurring effect in the perpendicular direction (i.e., the horizontal direction in FIG. 3B). This blurring along the horizontal direction is not caused by the relative movement between the camera and the object, but by the fact that the lenses and other optical elements of the measuring camera do not produce perfect images, but images that are subject to aberrations and other detrimental effects such as diffraction which limits the resolution. Put differently, even in the absence of any relative movement, there will be a certain degree of blurring, because light emitted from a point on the object does not only impinge on a single point on the image sensor, but on an area surrounding this point, as this has been explained above.

Therefore, in this situation, we have two contributions to blurring: the relative movement between the object and the camera, and the aberrations and other effects that are caused by or associated with the optics contained in the camera. For the sake of simplicity, we disregard in this context all detrimental effects that are associated with the image sensor of the camera, such as its finite resolution and the noise produced by its light sensitive elements.

b) Mathematical Description of Image Formation

In the following it will be explained how the image formation explained above can be described mathematically.

The object to be imaged can be described mathematically as an intensity distribution $o(x,y)$. This is a function depending on two variables and assigning to each position defined by coordinates $(x, y)$ in a certain plane a value a light intensity. We here disregard the topic of colors and restrict our consideration to the intensity alone. The function $o(x,y)$ may assign, for example, to each point with coordinates $(x, y)$ a value between 0 indicating black (i.e., no light is emitted) and 100 indicating white (i.e., highest possible intensity). Strictly speaking, the intensity distribution has physical units such watts per square meter, but for the sake of simplicity these will be omitted in the following. In the case of the object shown in FIG. 3A, intensity distribution $o(x,y)$, this function is simple, because there are only two different intensity values, one (e.g., 50) for the grey object, and 0 outside the object (no light is emitted there).

Similarly, the image formed on the image sensor of the camera can be described by an intensity distribution $I(x,y)$. If imaging was perfect, the two distributions $I(x,y)$ and $o(x,y)$ would be equal, apart from a possible scaling factor. In reality, however, there are detrimental effects on the imaging process as they have been explained above, for example a relative movement, or optical elements in the camera having non-ideal optical properties. These effect cause the two intensity distributions $I(x,y)$ and $o(x,y)$ to be usually different.

In a first approximation, it is assumed that these detrimental effects are identical for all points. For a relative movement between the object and the camera, this assumption is certainly justified, because all points experience the same relative movement. For example, the blurring effect for a point at the edge of the image should be the same as for a point at the center of the object.

For effects associated with optical aberrations of the camera, this assumption may not be completely justified. For example, simple optical systems have a better imaging quality at their center, i.e., for points in the vicinity of the optical axis, which is defined as the axis of symmetry of the optical system. But for measuring cameras that having expensive optics with aspherical lenses, etc., also this assumption is often a very good approximation.

With the approximation that the detrimental effects are identical for all points, a "trick" can be applied that simplifies matters considerably. If for all points the imaging process is subject to identical detrimental effects, and if this detrimental effect is known and can be mathematically described, one can compute the resulting image by applying these detrimental effects to each point individually. The final image is then simply the sum of all the contributions from the individual points on the object.

This will be explained in the following with reference to FIGS. 1A to 1C. FIG. 1A illustrates—if looked at with a strong microscope—the intensity distribution on the image sensor if only a single point on the object emits light. For reasons that will become apparent soon, we will refer to this intensity distribution of a single point as $p(x,y)$. One can see that the image of the single point is blurred, i.e., the light is not only concentrated on a single point on the image sensor but is distributed over an area surrounding a center. Usually (and also in this example), this center point is the point with the highest intensity. It should be noted that the real intensity distribution $p(x,y)$ on the image sensor is smooth and not pixelized. However, in order to simplify the computations, the real intensity distribution $p(x,y)$ of the image has been approximated by subdividing it into a plurality of squares each having a constant intensity.

Qualitatively, the intensity distribution $p(x,y)$ can be described as having an intensity maximum at its center. The intensity then slowly drops to zero with increasing distance from this center. The way how the intensity drops can be quite different. For example, in the presence of diffraction the decrease of the intensity will not be continuously, but wavy. In a good optical system, the intensity drops to zero very quickly, while in badly corrected optical systems the intensity drops down slowly.

This intensity distribution $p(x,y)$ of the image of a single point is referred to as a point spread function (PSF). This is a good description of what it denotes-how the image of a point is spread in the image plane. The point spread function can be measured by recording the intensity distribution obtained if a single point is imaged on an image sensor. Alternatively, it may be computed by simulation programs for a given optical system.

We now assume that the object to be imaged is a sharp line as shown in FIG. 1B. If each point on the line is imaged in the same manner as the point whose image is shown in FIG. 1A, one would obtain the blurred image as shown in FIG. 1C. This blurred image has been obtained by superimposing a huge number of images as shown in FIG. 1A. It should be evident that the more points are considered, and the better the point spread function p(x,y) used for the computations approximates the real intensity distribution $p_r(x,y)$, the more the computed image approximates the real image.

This process of superimposing the images of individual points can be described by the mathematical operation of convolution, denoted by the operator *.

Thus, in a first approximation, the image captured by a measuring camera can be described as convolution of a point spread function (PSF) and the object:

$$I = p * o \qquad (1)$$

In equation (1), a simplified notation is used in which the argument (x, y) has been omitted for each of the functions I, p and o for the sake of simplicity. Equation (1) expresses that the image defined by the irradiance distribution I can be described by convoluting the irradiance distribution o with the point spread function p. The convolution * mathematically describes that the point spread function p is applied to each point on the object (defined as irradiance distribution o), and all the contributions are superimposed. When the convolution is carried out, integrals have to be computed that reflect this superimposition. As mentioned earlier, this way of describing the imaging process relies on the assumption that the point spread function is identical for each point. Knowledge of the point spread function therefore makes it possible to compute the image for any arbitrary object (irradiance distribution o).

Put in a more scientific language, the convolution operation allocates to each point or pixel in an image/(i.e., a two-dimensional intensity distribution) the weighted sum of surroundings in o, the weights being given by the point spread function (PSF) p. We now return to the situation described above in which there is a relative movement between the object and the camera. As has been explained further above, there are two independent effects that superimpose. One effect is the blurring caused by the movement, and the other effect is the blurring caused by the camera optics. It turns out that the overall effect can itself be described by a convolution. In other words, the point spread function p in equation (1) is itself the convolution of two point spread functions $p_m$ and $p_s$, with $p_m$ being the point spread function associated with the movement, and $p_s$ being the point spread function associated with the optical system. This will be explained with reference to FIGS. 1A to 1C, which illustrate this interrelationship, too.

FIG. 1A illustrates again the point spread function, now referred to as $p_s$, associated with a single point in the absence of any relative movement. FIG. 1B illustrates the point spread function $p_m$ being the result of a relative movement along the vertical direction, but in the absence of any effects caused by the camera optics. FIG. 1C shows again convolution of functions shown in FIGS. 1A and 1B, here the convolution $p_m * p_s$ of the point spread functions describing the effects of the relative movement and of the camera optics. Illustratively speaking, a point on an object such as the disk shown in FIG. 3A will not be imaged as shown in FIG. 1A, but as a blurred line as shown in FIG. 1C.

Computing the image of the disk shown in FIG. 1C that is obtained by a moving measuring camera thus involves the computation of the convolution according to equation (1), but using now the point spread function $p = p_m * p_s$ that is shown in FIG. 1C. The result is shown in FIG. 3B that has been briefly discussed further above. One can see that all points in the image are significantly spread along the vertical direction due the movement (see FIG. 1B), but additionally in the vertical and the horizontal direction due to the effects caused by the non-ideal camera optics (see FIG. 1A). The two independent effects superimpose, and this can be mathematically described by the concept of convolution.

Put in a more scientific language, the point spread function $p = p_m * p_s$, which is also referred to mathematically as convolution kernel, encodes the intrinsic blur of the camera system $p_s$ and the motion of the camera $p_m$. A "larger" convolution kernel leads to a more blurred image since more details or points of the object contribute to the computation of an intensity value in the resulting image. This corresponds to the integration of the brightnesses of different details of the object in the same pixel of the camera sensor, which can then no longer be differentiated. Details appear blurred as a result.

The point spread function of a camera system $p_s$ is typically (at least approximately) isometric (i.e., does not depend on the direction so that the intensity drop is equal along all directions) and is shaped like a Gaussian bell, i.e., the influence of neighboring pixels decreases exponentially. In contrast thereto, the PSF of the camera motion $p_m$ is defined solely by the motion path of the camera during the exposure time. In the case of a linear motion, e.g., a line-like convolution kernel results as shown in FIG. 1C. The composite convolution kernel p results from the convolution of the individual convolution kernels $p_m$ and $p_s$.

If images are taken by a measuring camera, the aim is not to compute the image I from the object o using the point spread function according to equation (1), but to compute the object o from the image I taken by the measuring camera. Unfortunately, equation (1) cannot be simply rearranged so that o=I/p, as this would be possible if the convolution operator * was replaced by a simple multiplication. However, there is a kind of "trick" that can be used for obtaining information about the object o based on the image I if the point spread function p is known.

In conjunction with a known convolution kernel, the convolution theorem offers a simple approach for the direct reconstruction of the object o from the camera image I. The convolution theorem states that the convolution operation can be converted into a (pointwise) multiplication of the spectra of convolution kernel p and object o:

$$\mathcal{F}(I) = \mathcal{F}(p) \cdot \mathcal{F}(o) \qquad (2)$$

Here, $\mathcal{F}$ denotes the Fourier transform. The Fourier transform is an integral transform that takes a function (here p or o, respectively) as input and outputs another function that describes the extent to which various frequencies are present in the original function. The Fourier transform is also referred to as the "spectrum" of the original function, because it denotes, similar to the spectrum of light, the contributions from different frequencies (in the case of light: wavelengths or colors) to the original function).

FIG. 2 shows the logarithmic spectrum $\mathcal{F}(p)$ of the point spread function p shown in FIG. 1C. Fourier transforms are often not very illustrative, but there are some general properties that can sometimes be identified. For example, assuming that the point spread function p is a sine function, the spectrum $\mathcal{F}(p)$ would contain only two sharp peaks (it should be noted that only one of the peaks can be observed when measuring the spectrum, as the other peak represents a negative frequency). The "rounder" and more extended a function is (such as a sine function), the "sharper" the Fourier transform is, and vice versa. Since the point spread function p shown in FIG. 1C is narrow and sharp in the horizontal direction, its spectrum shown in FIG. 2 is extended considerably along this direction.

Fourier transforms $\mathcal{F}$ have the property that they are invertible. This means that it is possible to reconstruct the function p if its Fourier transform $\mathcal{F}(p)$ is given, using p= $\mathcal{F}^{-1}(F(p))$.

Returning to the convolution theorem according to equation (2), it should be noted that this equation does not contain the convolution operator *, but a simple multiplication. Therefore, the following reconstruction formula (3) can be obtained by rewriting equation (2) as $$o = \mathcal{F}^{-1}\left(\frac{\mathcal{F}(I)}{\mathcal{F}(p)}\right) \quad (3)$$

Therefore, according to formular (3), it is possible to reconstruct the object o by computing the Fourier transforms $\mathcal{F}(I)$ and $\mathcal{F}(p)$ of the image I and the point spread function p, respectively, dividing $\mathcal{F}(I)$ by $\mathcal{F}(p)$ and computing the inverse Fourier transform $\mathcal{F}^{-1}$ of the result.

However, the spectrum $\mathcal{F}(p)$ of the convolution kernel in equation (3) is in the denominator, zeros or very small values contained therein lead to undefined quotients or instabilities. The latter result in clearly visible artefacts upon the inversion of the Fourier transform of the quotient. This is a prominent issue, because, as can be seen in FIG. 2, the spectrum $\mathcal{F}(p)$ has not just one or two values being zero of very small, but due to the periodic character, a large number of such values.

A different interpretation arises if we consider equation (2) and bear in mind that zeros in the spectrum $\mathcal{F}(p)$ of the point spread function lead to zeros in the spectrum $\mathcal{F}(I)$ of the image-independent of the corresponding values in the spectrum $\mathcal{F}(o)$ of the object. The zeros in the spectrum of the convolution kernel thus lead to a loss of information.

The spectra of the point spread function p that occur in practice often have a large number of zeros particularly at lower frequencies, which leads to large-area and clearly visible artefacts if deconvolution is performed directly in accordance with equation (3). FIG. 3C shows the image computed by the direct deconvolution in accordance with equation (3) for the object shown in FIG. 3A, the point spread function shown in FIG. 1C and its Fourier transform $\mathcal{F}(p)$ shown in FIG. 2. As a result of the deconvolution, the image has been successfully deblurred, as shown by a comparison of FIGS. 3B and 3C, but artefacts have been added which are not tolerable in the case of a measuring camera.

c) Reducing Artefacts During Deconvolution-Prior Art Approaches

In order to reduce the artefacts, improved deconvolution methods have been proposed, e.g., the Wiener deconvolution in accordance with $$o = \mathcal{F}^{-1}\left(\frac{s\mathcal{F}(p)^*}{s|\mathcal{F}(p)|^2 + n}\mathcal{F}(I)\right) \quad (4)$$

Here, the superscript * denotes complex conjugation, and s is the mean power spectral density, as this is known in the art. In this case, by adding the summand n in the denominator, zeros or very small values of the spectrum $\mathcal{F}(p)$ of the point spread function are normalized to a higher value, such that the error amplification is reduced.

A different approach is taken in the class of deconvolution methods with least squares:

$$o^* \in \underset{o}{\mathrm{argmin}} \|p*o - I\|_2^2 + \lambda R(o) \quad (5)$$

The method of least squares is a parameter estimation method in regression analysis that is based on minimizing the sum of the squares of the residuals (i.e., the difference between an observed value, here I, and the fitted value provided by a model, here p*o).

In other words, the object o is reconstructed by minimization of the data term $$D(o) = \|p*o - I\|_2^2, \quad (6)$$

which measures how well the object o, when convoluted with the known point spread function p, matches the recorded image I. The second component in equation (5) is the regularizer R, which encodes additionally desired properties of the object and thus dominates the reconstruction particularly where the data term does not allow unambiguous reconstruction owing to missing information (i.e., if p is zero or very small). At places where both terms make a contribution, the parameter $\lambda$ has a determining influence on the weighting.

A form of regularization that is widespread in general in modern image processing is so-called total variation (TV regularization)

$$R(o) = \|\nabla o\|_1$$

which measures the absolute values of all sudden changes in the object. Regularization by this means fosters smoother objects, whereby otherwise indefinite regions in the reconstruction are replaced as plausibly as possible with neighboring values present.

A further variant of regularization consists in replacing the data term with the $$D(o)\|(p + \lambda\mathcal{F}^{-1}(I))*o - I\|_2^2$$

following. The linearity of the Fourier transform effectively results in a convolution, $$(p + \lambda\mathcal{F}^{-1}(I))*o = \mathcal{F}(p + \lambda\mathcal{F}^{-1}(I))\cdot\mathcal{F}(o) = (\mathcal{F}(p) + \lambda I)\cdot\mathcal{F}(o)$$

i.e., a form similar to that in the case of the Wiener filter.

The solution to the optimization problem (5) can be calculated iteratively.

If R(o)=0 or R(o)=$\|Ao\|_2^2$ with a linear operator A, then this is a least-squares problem which can be efficiently solved using the (preconditioned) conjugate gradient method or using preconditioned Richardson iterations.

If R(o) is a differentiable or convex (approximable) function, then this is a convex problem which can be efficiently solved using so-called splitting methods, such as generalized forward backward splitting or half quadratic splitting.

FIG. 4 shows the result of such an improved deconvolution for the exemplary image from FIG. 3B. The regularization brings about a clear reduction of the image artefacts compared with direct deconvolution. Other artefacts typical of the respective regularization remain, however, such as staircase artefacts (TV regularization) or inadequate image sharpness (Wiener deconvolution).

2. Sequence of the Measurement According to the Disclosure

FIG. 5 shows a schematic perspective illustration of a coordinate measuring machine, which is denoted by 10 overall.

The coordinate measuring machine 10 includes a base 12 that carries a table 14 on which a control panel 16 is fastened. Starting at the table 14, there is an upwardly extending stand 18 that carries a quill 20. As indicated by an arrow 22, the quill 20 is precisely displaceable in the vertical direction (z-direction) with the aid of a drive (not depicted here).

A measuring camera 24 which can be used to record an image of a workpiece 26 is fastened to the lower side of the quill 20. The workpiece 26 is fastened to an X-Y table 28, with which the workpiece 26 can be precisely displaced in the horizontal plane (x-direction and y-direction), as is indicated in FIG. 1 by arrows 30 and 32. This allows even relatively large workpieces 26 to be measured progressively with the aid of the measuring camera 24 by virtue of the workpiece 26 being incrementally introduced into the measurement field of the measuring camera 24 with the aid of the X-Y table 28. With the aid of the control panel 16, for example, the motion of the X-Y table can be predefined and at the same time stored, such that it can be repeated as often as desired exactly for other workpieces 26 of the same type.

If the intention is to measure even larger or particularly heavy workpieces 26, then the coordinate measuring machine 10 can also have a different mechanical structure and for example include a movable gantry, to which the quill 20 is fastened, instead of the X-Y table 28. In this way, the quill 20 can be precisely displaced not only along the z-direction but also along the x-direction and y direction, as is known per se from the prior art. Then there is no need to move the workpiece 26 during the measurement.

FIGS. 6A and 6B illustrate how the entire workpiece 26 is measured if the area to be measured is larger than the image segment 34—indicated in a dashed manner—of the measuring camera 24. For this purpose, the quill 20, to which the measuring camera 24 is fastened, is displaced relative to the stationary workpiece 26, as a result of which the image segment 34 moves over the surface 36 to be measured of the workpiece 26. A plurality of images of the surface 36 are recorded during this uninterrupted relative motion between the measuring camera 24 and the surface 36 of the workpiece 26, each image showing a different segment of the surface 36. In this case, the motion path of the quill 20 can be meandering, for example, and is dependent on the geometry of the surface 36. Ideally, the entire motion path is traversed by the quill 20 in an uninterrupted manner since the shortest measurement time can be realized in this way.

3. First Variant—a Plurality of Individual Images

In a first variant of the invention, at least two images of each segment 34 of the surface are recorded. Between the recordings of the two or more images, a recording parameter is changed such that the convolution kernels in the case of the at least two recordings differ from one another in at least one zero. The two or more images are blurred owing to the relative motion between the measuring camera 24 and the workpiece 26. The blur is computationally extracted by deconvolution by an evaluation device 35. Owing to the convolution kernels differing from one another in the position of the zeros, this gives rise to a gain in information that enables artefacts to be prevented from arising.

In the case of the multi-image deconvolution, proceeding from equation (5), a sum is added to the data term:

$$o^* \in \underset{o}{\mathrm{argmin}} \sum_{i=1}^{n} \|p_i * o - I_i\|_2^2 + \lambda R(o) \qquad (7)$$

As mentioned, the image recording conditions in the different measurements $I_1, \ldots, I_n$ are varied, which leads to different convolution kernels $p_1, \ldots, p_n$. The optimization problem in accordance with equation (7) still has the same mathematical structure as the optimization problem in equation (5), since the data term is still a sum of square errors. Consequently, it can also be solved using the methods described in the previous section in order in practice to remove the blur from the recorded images.

In this case, maximizing the information content means, firstly, implementing the convolution kernels $p_1, \ldots, p_n$ as far as possible such that the regions without zeros mutually complement one another and, consequently, the fewest possible zeros remain in the sum of the convolution kernels. Secondly, there should be the fewest possible zeros in the Fourier spectrum of the point spread function since every zero means a loss of information.

The recording parameter can be, e.g., a speed or direction of the motion of the quill 20, the exposure time or the intensity of the illumination.

FIG. 7 shows the result of the multi-image deconvolution using two different exposure times, the resulting PSF spectra of which complement one another well. A clear reduction of the artefacts is discernible, specifically both in comparison with direct individual-image deconvolution (cf. FIG. 3) and a comparison with individual-image deconvolution with additional regularization (cf. FIG. 4).

In order to stipulate which recording parameter is changed and how, a merit function can be defined, the value of which is optimized with the aid of an optimization algorithm. In this case, the merit function is typically proportional to a sum of normalized Fourier spectra of the point spread function, which is dependent on a plurality of recording parameters. As a result, the way in which the recording parameters ought to be varied between the images need not be stipulated by experiments or experience. This is explained in greater detail below.

Firstly, a merit function is defined as a measure of the common zero set of the PSF spectra:

$$L(\theta_1, \ldots, \theta_n) = \sum_{i=1}^{n} \|\mathcal{F}(p_i(\theta_i))\|_2^2$$

In this case, $\theta_i$ denotes the set of parameters describing the modulation of the PSF $p_i$ of the i-th recording. $\theta_i$ can thus be a vector consisting of a plurality of parameters, such as exposure time, speed of motion and/or direction of motion. However, it is also possible for more complex settings to be encoded in $\theta_i$, such as a non-linear motion of the camera. This can be implemented, e.g., as a parametrized curve or as a discretized path. In this case, the function $L(\theta_1, \ldots, \theta_n)$ measures the total intensity of the sum of all PSF spectra.

The idea, then, is for the optimum recording parameters to be computationally determined once again by way of an optimization problem:

$$\theta_1^*, \ldots, \theta_n^* = \arg\max_{\theta_1,\ldots,\theta_n} L(\theta_1, \ldots, \theta_n)$$

The desired solution can be determined with suitable optimization methods. What is necessary for this is that the dependence of the point spread function PSF on the parameters can be simulated, i.e., that $p_i(\theta_i)$ is actually calculable. That is indeed the case for the optical systems of modern measuring cameras 24.

In general, the relationships between the recording parameters and the form of the point spread function PSF are describable by a simple analytical model or at least one differentiable simulation. In this case, an efficient gradient descent method can be used for determining the optimum parameters.

4. Second Variant—Single Images

While two or more images of each segment of the surface are recorded in the first variant, only exactly one image of each segment of the surface is recorded in a second variant. For this purpose, during the recording of the exactly one image at least one recording parameter is changed such that the convolution kernel during the recording changes in at least one zero.

This can be realized, e.g., by virtue of the fact that during the exposure the intensity of the illumination is changed, or use is made of the relative motion between the measuring camera 24 and the workpiece 26, said relative motion being present anyway in the course of the measurement. In the latter case, the disclosure is manifested in the fact that, granted, the relative motion leads to blur. However, since the relative motion—unlike in normal photography—is accurately known with regard to its direction and speed and is predefined by the control of the quill 20, the image blur caused thereby can be computationally extracted again completely or at least very substantially without artefacts by calculation of the convolution kernels.

5. Summary

The disclosure aims at reducing blur in images taken by a measuring camera that moves over an object, or generally if there is a relative motion between the object and the measuring camera. The disclosure is based on the concept of deconvolution. Deconvolution implies that the point spread function is determined for the specific camera and for the recording parameters that define "how" the image was taken. Based on the image taken by the measuring camera and the point spread function, it is possible to reconstruct the object even if the recorded image is blurred.

However, the computation required for this reconstruction involves a division by the Fourier spectrum of the point spread function. Since the latter usually has many zeros, there is a loss of information, and the reconstructed object displays undesired artefacts.

The disclosure reduces the number of zeros in the point spread function, and therefore the artefacts in the reconstructed object, by using not only one point spread function p (also referred to as convolution kernel) and one image, but two or more point spread functions $p_i$, which have zeros at different positions, and a corresponding number of different images $I_i$. In an exemplary embodiment, the different point spread functions $p_i$ and images $I_i$ are used in a common least square algorithm that computationally modifies the object until the computed images approximate the real recorded images $I_i$ as good as possible, see equation (7).

For ensuring that the point spread function is different for each image, a recording parameter such as a speed or a direction of the relative motion, an exposure time or an intensity of the illumination is modified between the exposures.

A similar reduction of artefacts can be obtained if only a single image is used as in prior art approaches, but the point spread function is modified non-linearly while this image is taken, for example by changing the intensity of the illumination.

What is claimed is:

1. A method for a contactless measurement of an object with a measuring camera, the method comprising:
   producing an uninterrupted relative motion between the measuring camera and a surface of the object;
   recording a plurality of images of the surface of the object during the uninterrupted relative motion, each of the plurality of images showing a different segment of the surface; and
   computationally extracting a blur of the plurality of images that is produced by the uninterrupted relative motion by applying a deconvolution algorithm with different convolution kernels that differ from one another in at least one zero and a point spread function changes non-linearly.

2. The method according to claim 1, wherein:
   at least two images of each segment of the surface are recorded, and
   between at least two recordings of the at least two images at least one recording parameter is changed such that the convolution kernels of the at least two recordings differ from one another in at least one zero.

3. The method according to claim 1, wherein:
   exactly one image of each segment of the surface is recorded, and
   during a recording of the exactly one image at least one recording parameter is changed such that the convolution kernel during the recording changes in at least one zero.

4. The method according to claim 2, wherein the at least one recording parameter is selected from the group consisting of:
   a speed of the relative motion,
   a direction of the relative motion,
   an exposure time, and
   an intensity of an illumination.

5. The method according to claim 3, wherein the at least one recording parameter is selected from the group consisting of:
   a speed of the relative motion,
   a direction of the relative motion,
   an exposure time, and
   an intensity of an illumination.

6. The method according to claim 2, further comprising:
defining a merit function;
providing an optimization algorithm;
stipulating, with the merit function, which of the at least one recording parameter is changed and how the at least one recording parameter is changed; and
optimizing a value of the at least one recording parameter with the optimization algorithm.

7. The method according to claim 3, further comprising:
defining a merit function;
providing an optimization algorithm;
stipulating, with the merit function, which of the at least one recording parameter is changed and how the at least one recording parameter is changed; and
optimizing a value of the at least one recording parameter with the optimization algorithm.

8. The method according to claim 6, wherein the merit function is proportional to a sum of normalized Fourier spectra of the point spread function, which is dependent on a plurality of recording parameters.

9. The method according to claim 7, wherein the merit function is proportional to a sum of normalized Fourier spectra of the point spread function, which is dependent on a plurality of recording parameters.

10. An apparatus for a contactless measurement of an object, the apparatus comprising:
a displacement device;
a measuring camera;
a control device configured to control the displacement device such that the measuring camera is moved in an uninterrupted relative motion relative to a surface of the object, the measuring camera recording a plurality of images of the surface of the object during the uninterrupted relative motion, each of said images showing a different segment of the surface; and
an evaluation device configured to computationally extract a blur of the plurality of images that is produced by the uninterrupted relative motion by applying a deconvolution algorithm with different convolution kernels that differ from one another in at least one zero and a point spread function changes non-linearly.

11. The apparatus according to claim 10, wherein:
the control device is configured to record at least two images of each segment of the surface, and
between at least two recordings of the at least two images at least one recording parameter is changed such that the convolution kernels of the at least two recordings differ from one another in at least one zero.

12. The apparatus according to claim 10, wherein:
the control device is configured to record exactly one image of each segment of the surface, and
during a recording of the exactly one image at least one recording parameter is changed such that the convolution kernel during the recording changes in at least one zero.

* * * * *

UNITED STATES PATENT AND TRADEMARK OFFICE
CERTIFICATE OF CORRECTION

| | | |
|---|---|---|
| PATENT NO. | : 12,367,559 B2 | Page 1 of 1 |
| APPLICATION NO. | : 18/743041 | |
| DATED | : July 22, 2025 | |
| INVENTOR(S) | : Aksel Göhnermeier and Niklas Mevenkamp | |

It is certified that error appears in the above-identified patent and that said Letters Patent is hereby corrected as shown below:

On the Title Page

Item (56) Replace "2018/0295410 A1 10/2018 Shinozaki" with "2018/0295410 A1 10/2018 Shinozaki et al."

Signed and Sealed this
Fourth Day of November, 2025

John A. Squires
*Director of the United States Patent and Trademark Office*